Oct. 16, 1934.  M. J. NAPIER ET AL  1,977,348
PLACING APPARATUS
Filed May 15, 1933   3 Sheets-Sheet 1

Inventors
M. J. Napier
A. B. Schultz

By John G. Ellis
Attorney

Oct. 16, 1934.                M. J. NAPIER ET AL                1,977,348
                                PLACING APPARATUS
                    Filed May 15, 1933            3 Sheets-Sheet 2
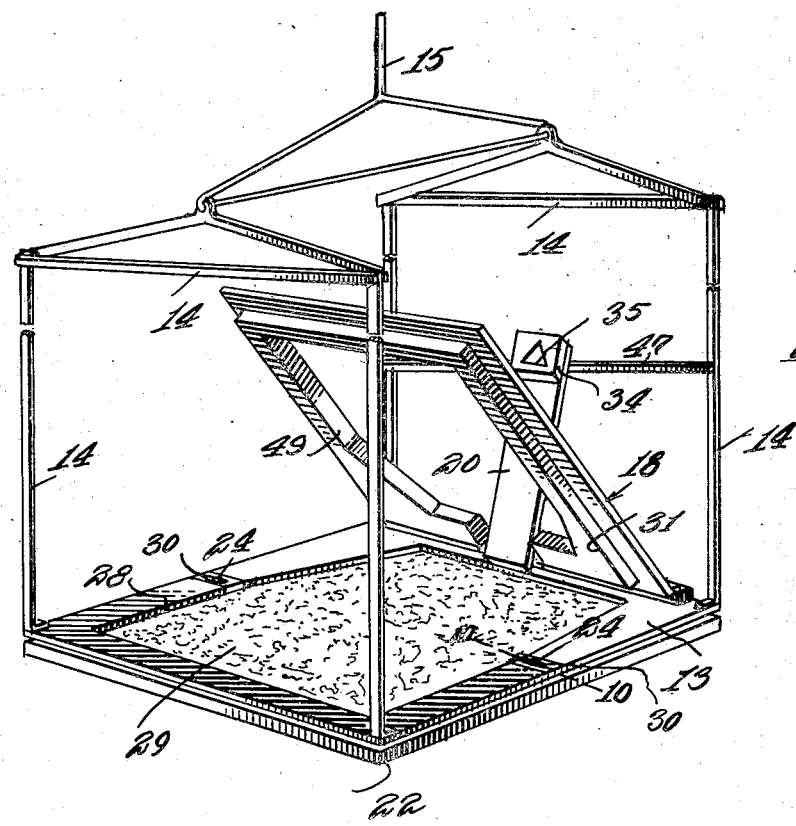
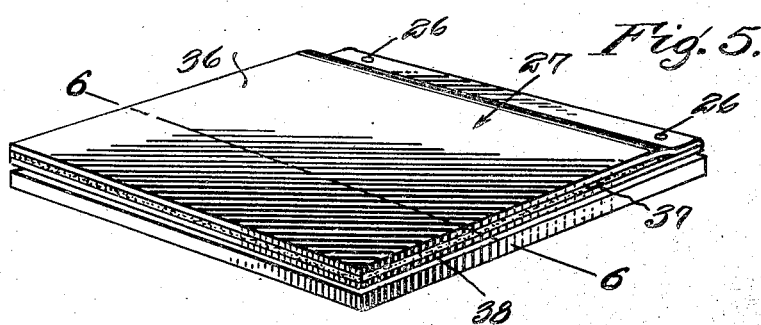
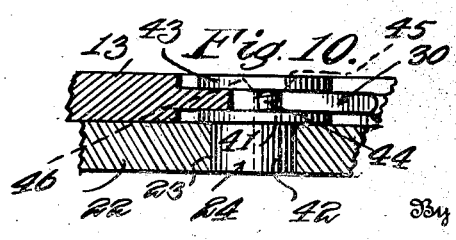

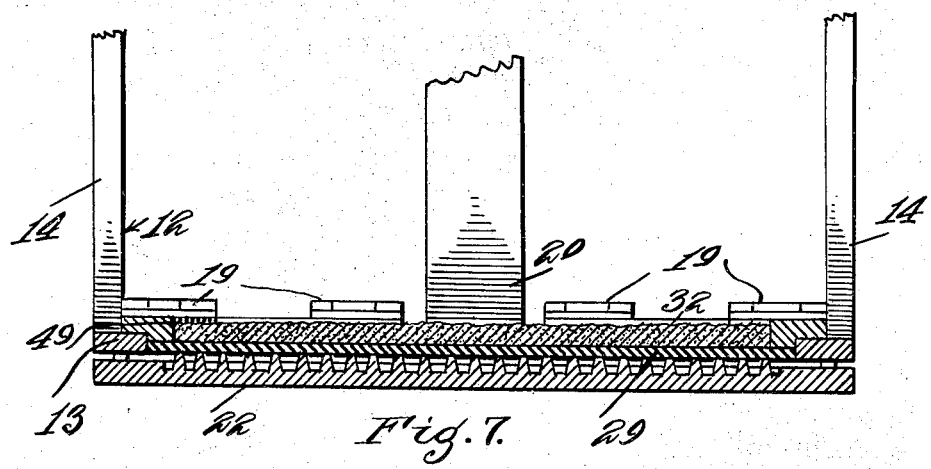
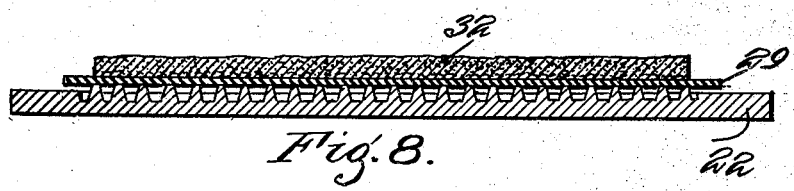
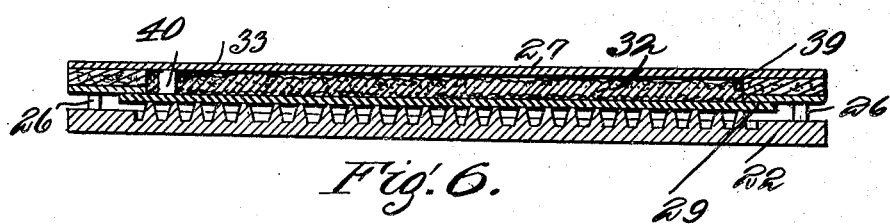
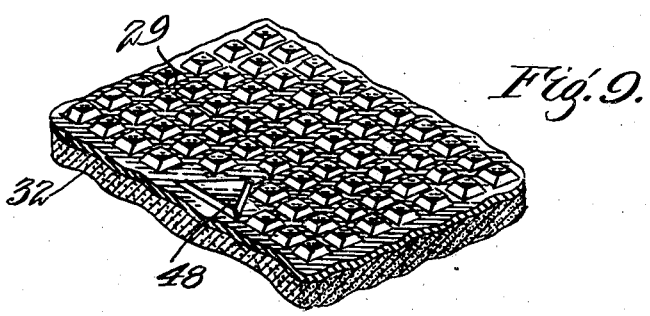

Patented Oct. 16, 1934

1,977,348

UNITED STATES PATENT OFFICE 1,977,348

PLACING APPARATUS

Melvin J. Napier, Akron, and Albert B. Schultz, Cleveland, Ohio

Application May 15, 1933, Serial No. 671,270

12 Claims. (Cl. 18—2)

Our invention relates to apparatus for and methods of handling plastic vulcanizable material and it has particular relation to apparatus for and method of constructing rubber containing mats.

In the past and at present, manufacturers of automobile floor mats, stair treads and similar articles composed of a plurality of plies of material united by vulcanization have experienced considerable difficulty in the proper positioning of the constituent elements for vulcanization.

For example, when it was desired to construct an automobile floor mat comprising a sheet of rubber having a perforated felted mat vulcanized to one side thereof and bearing on the other side a colored trade-mark or other ornamentation in colored rubber, the various parts had to be positioned by guess with no assurance that they would retain their position during vulcanization.

Usually a flat steel plate is utilized for the lower mold portion, the perforated felt is positioned on the steel plate by lining the latter with scratches, the apertures in the felt are filled with a plurality of loose blocks or fillets and other metal strips are positioned around the felt to define the unpadded border of the mat, the rubber sheet is then positioned over the mat and approximately positioned by other scratches on the steel plate and then a hard rubber mold part formed corrugated or otherwise formed to produce the desired tread surface on the mat is positioned in the same manner upon the rubber sheet. It has been considered impossible to suitably dowel the steel plate and the upper mold part together because of the fact that the rubber, of which the mold part is formed shrinks with use.

The primary object of our invention is to obviate the difficulties coincident with the present apparatus and process by the provision of mechanism capable of accurately positioning the constituent parts of a mat and retaining them in proper position during vulcanization.

Another object of our invention is the provision of vulcanizing apparatus for mats and the like which will materially decrease the labor required and cost of mat construction.

Another object of the invention is to provide a novel placing apparatus for accurately positioning articles in molds.

Another object of our invention is to provide a novel mold.

Our inventive concept also contemplates a novel method of making automobile mats or similar articles of manufacture.

For a better understanding of the invention, reference may now be had to the accompanying drawings, forming a part of the disclosure, wherein:

Figure 2 is a similar view of a portion of the apparatus shown in Figure 1 in a different condition associated with a mold part and having a sheet of rubber in position therein;

Figure 5 is a perspective view of the upper and lower mold parts in assembled relation;

Figure 6 is a sectional view taken substantially along line 6—6 of Figure 5;

Figure 7 is a sectional view, partially broken away and taken substantially along line 7—7 of Fiugre 1;

Figure 8 is a sectional view similar to that shown in Figure 7 with the placer device removed and illustrating the disposition of the rubber sheet and felt on the lower mold part in readiness for association of the upper mold part therewith;

Figure 9 is a fragmentary perspective view, partially broken away, of a portion of the mat construction made in accordance with our invention, and Figure 10 is an enlarged fragmentary sectional view taken substantially along the line 10—10 of Figure 2 illustrating an eccentric dowel utilized to bring about proper association of parts in spite of irregularities in either of the parts.

Figure 1:
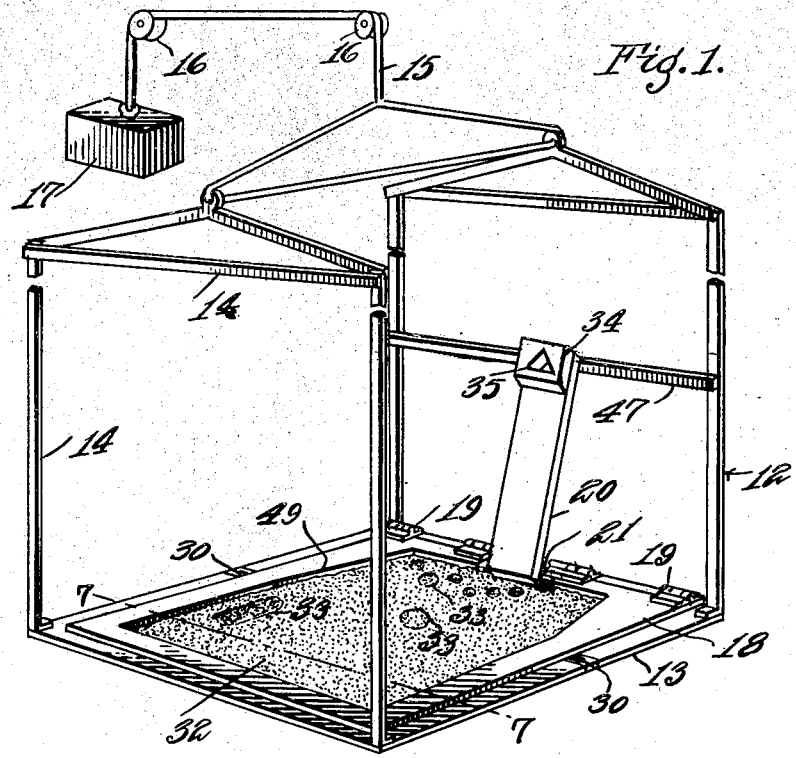
Figure 1 is a perspective view, partially broken away to conserve space, illustrating an article placing apparatus involving certain of the novel features of our invention with a preformed felt sheet positioned therein.
Figure 3:
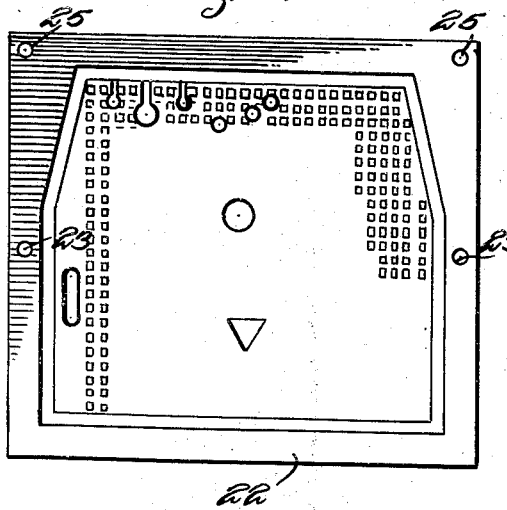
Figure 3 is a top plan view of the mold part shown in Figure 2.
Figure 4:
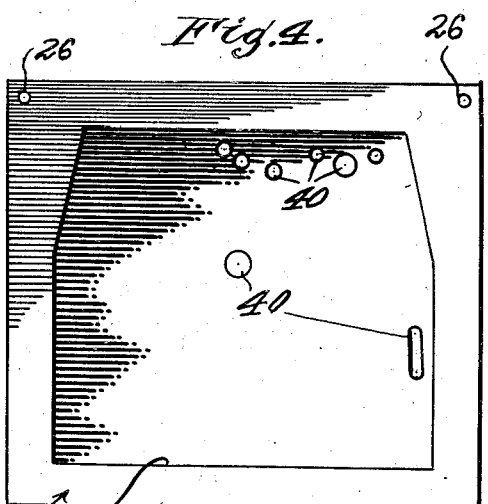
Figure 4 is a bottom plan view of the upper mold part.

In the embodiment of our invention illustrated in the accompanying drawings, a placing apparatus indicated generally as 12 consists of a rectangular open template 13, a frame 14 secured to the template 13 and connected by a cable 15 passing over pulleys 16 to a suspended counterbalancing weight 17, a rectangular open template 18 hingedly connected as indicated at 19 to the template 13, and an elongated template 20 also hingedly connected to the template 13 as indicated at 21. A bottom mold part 22 is cut in the usual manner to define a cavity for forming the rubber sheet which is to constitute the upper layer of the completed mat. The mold part 22 is preferably constructed of hard rubber which will not fuse with the material of the mat at vulcanizing temperatures and is provided with a pair of dowel holes 23 for the reception of dowels 24 carried by the template 13 and a pair of dowel holes 25 for the reception of similar dowels 26 carried by the upper mold part 27 to be described in detail hereinafter. The bottom mold part 22 is adapted to be mounted on a work table (not shown) under the placer apparatus 12 in order that the latter may be raised and lowered into and out of engagement therewith.

Preferably and as shown, the template 13 is cut out to define a recess 28 for reception of a rubber sheet 29 and is provided with slots 30 at either side for reception of the dowels 24 for positioning the placer 12 and bottom mold part 22 in their predetermined associated relation. The slots 30 are provided in order that the dowels 24 may be movable with respect to template 13 in order to fit within the dowel holes 23 and tightened in position even though the bottom mold part may be somewhat warped from its original shape.

As shown the template 18 is provided with a rectangular downwardly projecting portion 31 which fits within the recess 29 of the template 13 and bears upon the rubber sheet 29 in use of the device to define the unfelted portion of the rear surface of the mat whereas the center of the entire template 18 is cut out as indicated at 49 to receive a preformed mat 32 of felt or the like which has relatively large apertures 33 therethrough at points where the rubber sheet 29 is later to be cut out for operating devices of the automobile with which the mat is to be used.

The template 20, as shown, carries at its free end a depending block 34 designed in the lowered position of the template to extend flush with the bottom of the template 13. A triangular aperture 35 is formed centrally of the block 34 and extends through the template 20 through which material, for example a triangular piece 48 of colored rubber may be accurately positioned upon the lower mold part 22 to constitute a trade-mark or other representation.

Obviously, the template 20 could be of any desired form and be variably perforated to accurately position in the mold the material representing a trade-mark or ornamentations on the top surface of the finished mat. The upper mold part 27 preferably formed of a pad of cloth or other flexible fibrous material and bent centrally to define an imperforate top sheet 36 having affixed to its under surface a hollow rectangular spacing element 37 of fibrous material and a bottom sheet 38 cut out as indicated at 39 to fit the mat 32, a plurality of pressure members 40 designed to pass through the preformed apertures 33 in the mat 32 to engage the rubber sheet 29 are permanently secured to the sheet 36.

The dowels 24 which are necessary in order to properly assemble the parts, even though one or more of the parts be warped from its original shape, comprise a centrally apertured washer 41 provided with an eccentrically positioned boss 42 of a size to snugly fit within the aperture 23 or 25, as the case may be, in the bottom mold part 22, a centrally apertured washer 43 and a machine screw 44 having a tapered head 45 fitting flush with the top of the washer 43 by reason of countersinking 46 therein. The machine screw 44 has threaded connection with the boss 42. Obviously, this construction permits entrance of the dowel and the securing thereof in various positions.

In operation of our novel apparatus, the placer apparatus 12 would be in elevated position directly above the lower mold part 22, the latter resting on a work table (not shown). The placer apparatus 12 would then be lowered into position over the mold part 22 and securely doweled thereto by means of the dowels 24 in the dowel holes 23, after which the template or apron 20 would be lowered and material be spotted in the mold through the aperture 35. The template 20 would then be raised and rested against supporting frame member 47. The sheet 29 of rubber would then be positioned within the recess 28 of the template 13, and the template or apron 18 would be lowered into position as best shown in Figure 1 of the drawings. The preformed felt mat 32 would then be positioned upon the rubber sheet 29 and within the recess of the template 18 after which the placer apparatus is released from the bottom mold part 22 and elevated.

The upper mold part 27 is then placed and secured in position upon the lower mold by means of dowels 26 engaging in dowel holes 25. The mold and contents are then in the condition as indicated by the sectional view, Figure 6, in readiness for application of pressure and vulcanization in the usual manner.

From the foregoing detailed description of the method of and apparatus for utilizing it in the manufacture of an automobile mat, it is apparent that by reason of our invention, a great saving of time and labor in the manufacture of such articles will result.

Although we have illustrated only one form which our invention may assume and have described that form in detail, it will be apparent to those skilled in the art that the invention is not so limited but that various minor modifications may be made therein without departing from the spirit of our invention or from the scope of the appended claims.

We claim:

1. Apparatus for placing articles in a mold comprising in combination, a mold, a hollow frame, means for securing the frame in predetermined position over the mold, and a template pivotally connected to the frame and apertured to conform to the shape of an article to be positioned in the mold.

2. Apparatus for placing articles in a mold comprising in combination, a mold, a hollow frame, means for securing the frame in predetermined position over the mold, and a template hinged to and overlying the frame and apertured to conform to the shape of an article to be positioned in the mold.

3. Apparatus for placing articles in a mold comprising in combination, a mold, a frame, means for securing the frame in predetermined position over the mold, and a template pivotally connected to the frame, the frame and the template each being apertured to conform to the shape of an article to be positioned in the mold.

4. Apparatus for placing articles in a mold comprising in combination, a mold, a frame, means for securing the frame in predetermined position over the mold, and a plurality of templates pivotally connected to the frame and selectively movable substantially into the plane of the frame, the frame and each of the templates being apertured to conform to the shape of a different article to be positioned in the mold.

5. Placing apparatus comprising, a template formed with an aperture of predetermined size, and a second template pivotally connected thereto and formed with a part fitting within the aperture of the first mentioned template.

6. Placing apparatus comprising a plurality of pivotally connected apertured templates one of which is formed with a part fitting within the aperture in the other template.

7. Placing apparatus comprising a plurality of pivotally connected apertured templates wherein the free end of one of the templates is capable of movement through the aperture in the other template.

8. Placing apparatus comprising a plurality of pivotally connected apertured templates one of which is formed with a part fitting within the aperture of another template wherein the free end of one of the templates is capable of movement through the aperture in another template.

9. Placing apparatus comprising a plurality of pivotally connected apertured templates one of which is formed with a part fitting within the aperture of another template wherein the free end of one of the templates is capable of movement through the apertures in the other templates.

10. Placing apparatus comprising, a frame including an apertured base constituting a template, counterbalancing means associated with the frame to expedite vertical movement thereof, and a template pivotally connected to the base and partially movable into the plane thereof.

11. Placing apparatus comprising, a frame including an apertured base constituting a template, counterbalancing means associated with the frame to expedite vertical movement thereof, and a template pivotally connected to the base and partially movable into the plane thereof and a plurality of templates pivotally connected to the base and selectively movable substantially into the plane thereof.

12. In combination, a mold part formed with dowel receiving apertures, and a placing apparatus provided with adjustable dowels for securing the apparatus in predetermined position on the mold part.

MELVIN J. NAPIER.
ALBERT B. SCHULTZ.